US009588707B2

(12) United States Patent
Ford et al.

(10) Patent No.: US 9,588,707 B2
(45) Date of Patent: Mar. 7, 2017

(54) OBJECT STORAGE POWER CONSUMPTION OPTIMIZATION

(71) Applicant: International Business Machines Corporation, Armonk, NY (US)

(72) Inventors: Egan F. Ford, Draper, UT (US); Michael J. Fork, Gibsonburg, OH (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 14/607,407

(22) Filed: Jan. 28, 2015

(65) Prior Publication Data
US 2016/0216911 A1    Jul. 28, 2016

(51) Int. Cl.
G06F 3/06        (2006.01)

(52) U.S. Cl.
CPC ............ *G06F 3/0625* (2013.01); *G06F 3/067* (2013.01); *G06F 3/0634* (2013.01); *G06F 3/0659* (2013.01)

(58) Field of Classification Search
CPC .... G06F 3/0625; G06F 3/0634; G06F 3/0659; G06F 3/067; G06F 3/0611; G06F 3/0647; G06F 3/0628
USPC .................................................. 711/111, 114
See application file for complete search history.

(56) References Cited

U.S. PATENT DOCUMENTS

| | | | |
|---|---|---|---|
| 6,964,539 B2 | 11/2005 | Bradley et al. | |
| 8,650,299 B1 * | 2/2014 | Huang | G06F 9/5077 709/226 |
| 2002/0007463 A1 | 1/2002 | Fung | |
| 2007/0192406 A1 | 8/2007 | Frietsch et al. | |
| 2015/0269025 A1 * | 9/2015 | Krishnamurthy | G06F 11/1092 714/6.24 |

OTHER PUBLICATIONS

Bostoen, T., Mullender, S. and Y. Berbers, "Power-Reduction Techniques for Data-Center Storage Systems," ACM Computing Systems, vol. 45, No. 3, Article 33, Jun. 2013.*

* cited by examiner

*Primary Examiner* — Midys Rojas
*Assistant Examiner* — Tracy A Warren
(74) *Attorney, Agent, or Firm* — William H. Hartwell; Madeline F. Schiesser; Keohane & D'Alessandro PLLC (57) ABSTRACT

An approach for object storage power consumption optimization in a networked storage environment is provided. In a typical embodiment, a plurality of memory devices are organized into pods having a predetermined number of memory devices and to which redundantly replicated objects are intelligently placed. At least one pod is activated in a read-write configuration, such that data written to the networked storage environment is written to this pod. At least one other pod is a deactivated pod, which has at least one designated memory device in a read-only configuration and a remainder of devices in a deactivated state. Requests for data contained in this deactivated pod are serviced by the designated memory device in the read-only configuration. In some embodiments, the activated and deactivated pods are rotated based on an event.

18 Claims, 5 Drawing Sheets

OBJECT STORAGE POWER CONSUMPTION OPTIMIZATION

TECHNICAL FIELD

This invention relates generally to object storage and, more specifically, to managing power consumption of object storage devices in a networked storage environment (e.g., a cloud computing storage environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

One advantage of cloud computing environments is that users and developers often have tools to enable the creation and/or utilization of services. Sometimes, such tools can condense the period of time involved in the creation and/or utilization of these services. One service typical of the cloud computing environment is data storage. In some forms of cloud-based data storage, the data is managed as objects. Each object typically includes the data itself, a variable amount of metadata, and/or a globally unique identifier. Object storage can be implemented at multiple levels, including the device level (object storage device), the system level, and the interface level.

Some forms of cloud-based object storage may replicate stored objects in order to provide greater reliability of the storage. In replicated or redundant object storage, copies of objects are created and/or placed across a set of storage devices. These objects can be placed intelligently, which can involve placing the redundant objects as uniquely as possible (e.g., different racks, different systems, different drives). Unique placement can permit greater reliability in the event of a failure in a single storage device, because in such an event, a copy of the object should remain available on one or more different storage devices.

SUMMARY

Embodiments described herein provide an approach for object storage power consumption optimization in a networked storage environment. In a typical embodiment, a plurality of memory devices are organized into pods having a predetermined number of memory devices and to which redundantly replicated objects are intelligently placed. At least one pod is activated in a read-write configuration, such that data written to the networked storage environment is written to this pod. At least one other pod is a deactivated pod, which has at least one designated memory device in a read-only configuration and a remainder of devices in a deactivated state. Requests for data contained in this deactivated pod are serviced by the designated memory device in the read-only configuration. In some embodiments, the activated and deactivated pods are rotated based on an event.

A first aspect of the present invention includes a method for object storage in a networked storage environment, the method comprising the processes of: organizing a plurality of memory devices in a networked storage environment into a plurality of pods, each pod having a predetermined number of the memory devices; selecting a first pod in the plurality of pods as an active pod, wherein the active pod is in a read-write configuration such that all written data in the networked storage environment is written to the active pod and is replicated among all of the memory devices in the active pod; delegating a second pod in the plurality of pods as one of a set of deactivated pods, wherein each deactivated pod in the set of deactivated pods includes a designated memory storage device in a read-only configuration and a set of remainder memory storage devices in a deactivated state such that all read requests for objects contained in the deactivated pod are serviced by the designated memory storage device; and reclassifying, in response to an event, the second pod as the active pod and the first pod as one of the set of deactivated pods.

Another aspect of the present invention includes a memory storage system for storing objects in a networked storage environment, comprising: a plurality of memory storage devices in a networked storage environment; a set of pods into which the plurality of memory storage devices are organized, the set of pods including an active pod and a set of deactivated pods, each pod of the set of pods having a plurality of the memory storage devices of a predetermined number; and at least one computer device that executes a set of instructions that causes the system to: write, in response to a request to write an object, the object on all of the memory storage devices in the active pod, wherein all writes performed in the networked storage environment are performed on the active pod; retrieve, in response to a read request for an object stored on a deactivated pod of the set of deactivated pods, the object from a designated memory storage device in the deactivated pod, all remainder memory storage devices in the deactivated pod being deactivated; and reclassify, in response to an event, the active pod as one of the deactivated pods and one of the deactivated pods as the active pod.

Yet another aspect of the present invention includes a computer program product for object storage in a networked storage environment, the computer program product comprising a computer readable storage device, and program instructions stored on the computer readable storage device, to: organize a plurality of memory devices in a networked storage environment into a plurality of pods, each pod having a predetermined number of the memory devices; select a first pod in the plurality of pods as an active pod, wherein the active pod is in a read-write configuration such that all written data in the networked storage environment is written to the active pod and is replicated among all of the memory devices in the active pod; delegate a second pod in the plurality of pods as one of a set of deactivated pods, wherein each deactivated pod in the set of deactivated pods includes a designated memory storage device in a read-only configuration and a set of remainder memory storage devices in a deactivated state such that all read requests for objects contained in the deactivated pod are serviced by the designated memory storage device; and reclassify, in response to an event, the second pod as the active pod and the first pod as one of the set of deactivated pods.

Still yet another aspect of the present invention includes a method for deploying a system for object storage in a networked storage environment, comprising: providing a computer infrastructure being operable to perform the processes of: organizing a plurality of memory devices in a networked storage environment into a plurality of pods, each pod having a predetermined number of the memory devices; selecting a first pod in the plurality of pods as an active pod, wherein the active pod is in a read-write configuration such that all written data in the networked storage environment is written to the active pod and is replicated among all of the memory devices in the active pod; delegating a second pod in the plurality of pods as one of a set of deactivated pods, wherein each deactivated pod in the set of deactivated pods includes a designated memory storage device in a read-only configuration and a set of remainder memory storage devices in a deactivated state such that all read requests for objects contained in the deactivated pod are serviced by the designated memory storage device; and reclassifying, in response to an event, the second pod as the active pod and the first pod as one of the set of deactivated pods.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which exemplary embodiments are shown. It will be appreciated that this disclosure may be embodied in many different forms and should not be construed as limited to the embodiments set forth herein. Rather, these illustrative embodiments are provided so that this disclosure will be thorough and complete and will fully convey the scope of this disclosure to those skilled in the art. In the description, details of well-known features and techniques may be omitted to avoid unnecessarily obscuring the presented embodiments.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, approaches for object storage power consumption optimization in a networked storage environment are provided. In a typical embodiment, a plurality of memory devices are organized into pods having a predetermined number of memory devices and to which redundantly replicated objects are intelligently placed. At least one pod is activated in a read-write configuration, such that data written to the networked storage environment is written to this pod. At least one other pod is a deactivated pod, which has at least one designated memory device in a read-only configuration and a remainder of devices in a deactivated state. Requests for data contained in this deactivated pod are serviced by the designated memory device in the read-only configuration. In some embodiments, the activated and deactivated pods are rotated based on an event.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
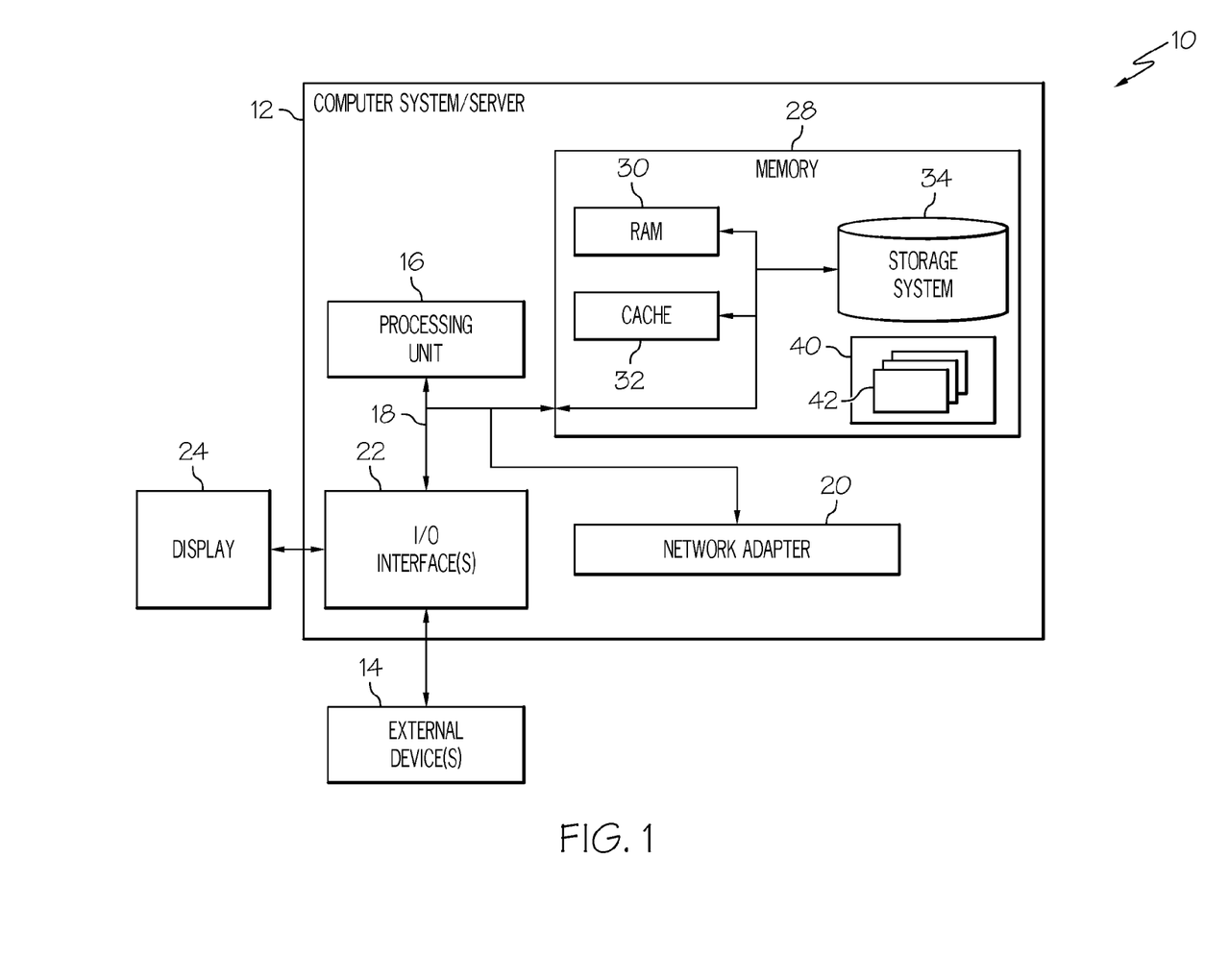
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Referring now to FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
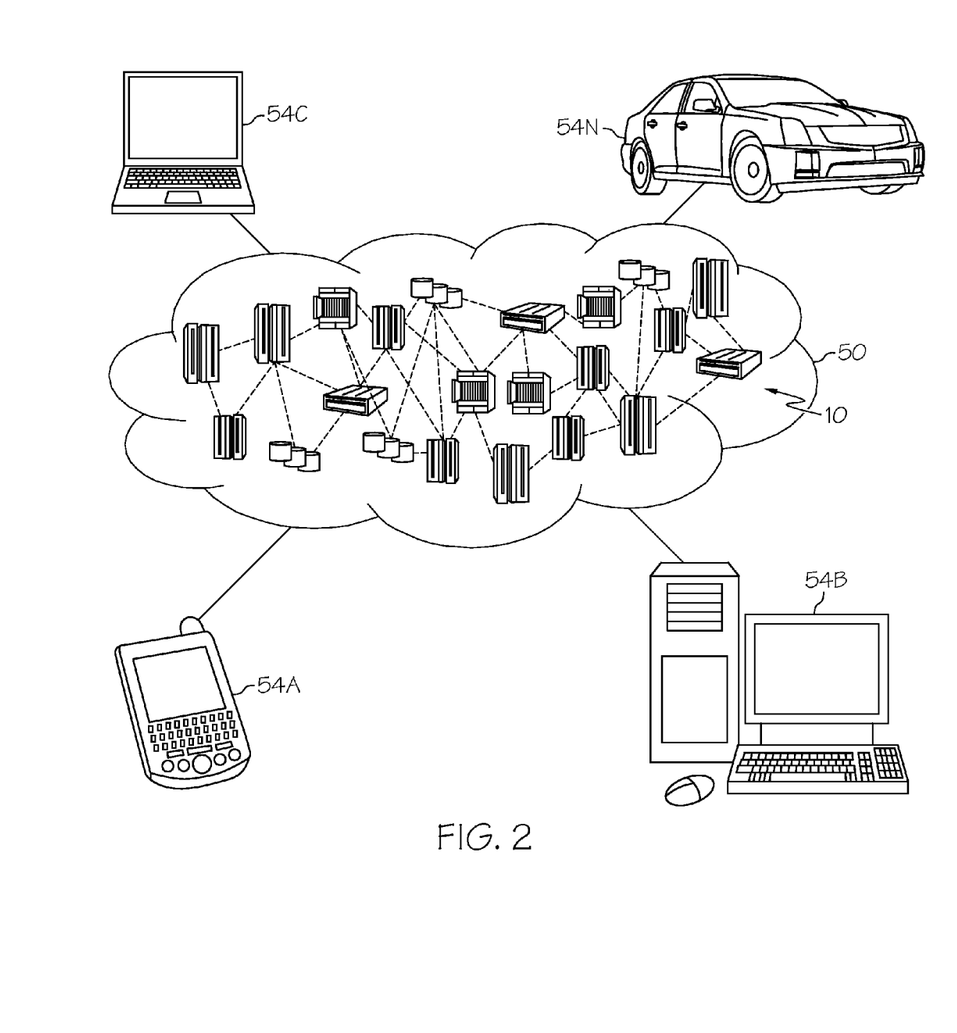
FIG. 2 depicts a cloud computing environment according to an embodiment of the present invention.

Referring now to FIG. 2, illustrative cloud computing environment 50 is depicted. Cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
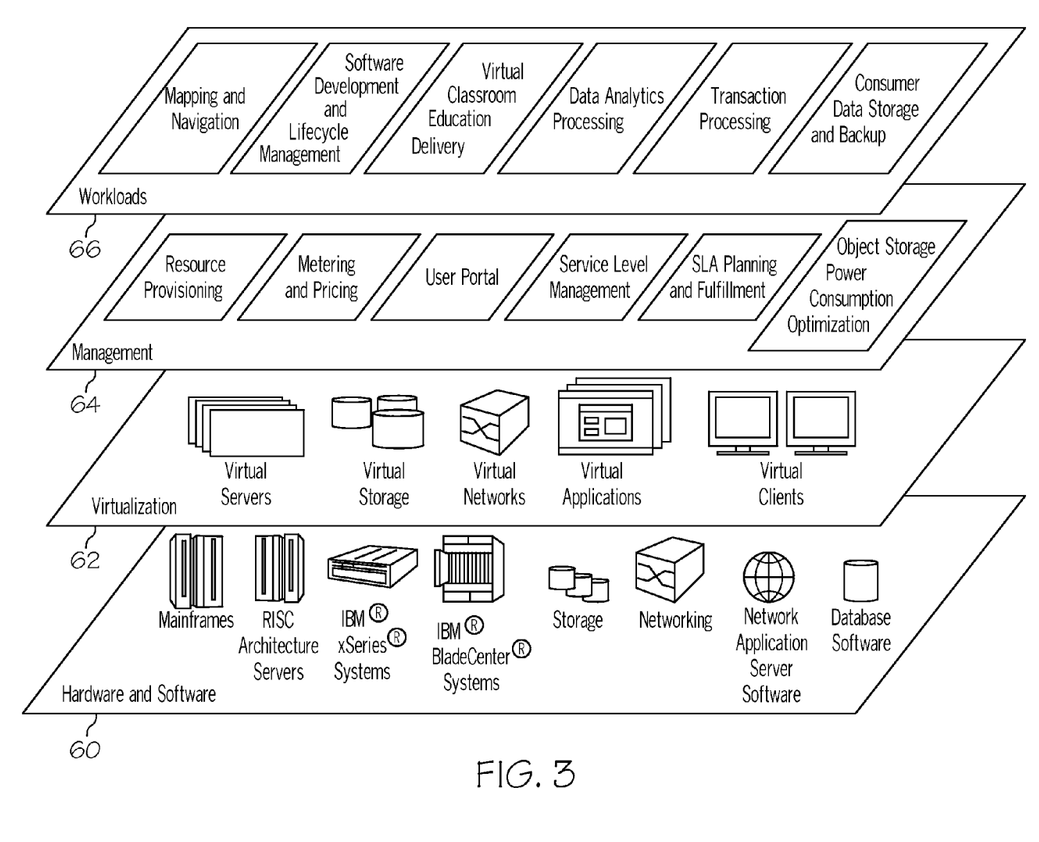
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is object storage power consumption optimization, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the object storage power consumption optimization functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
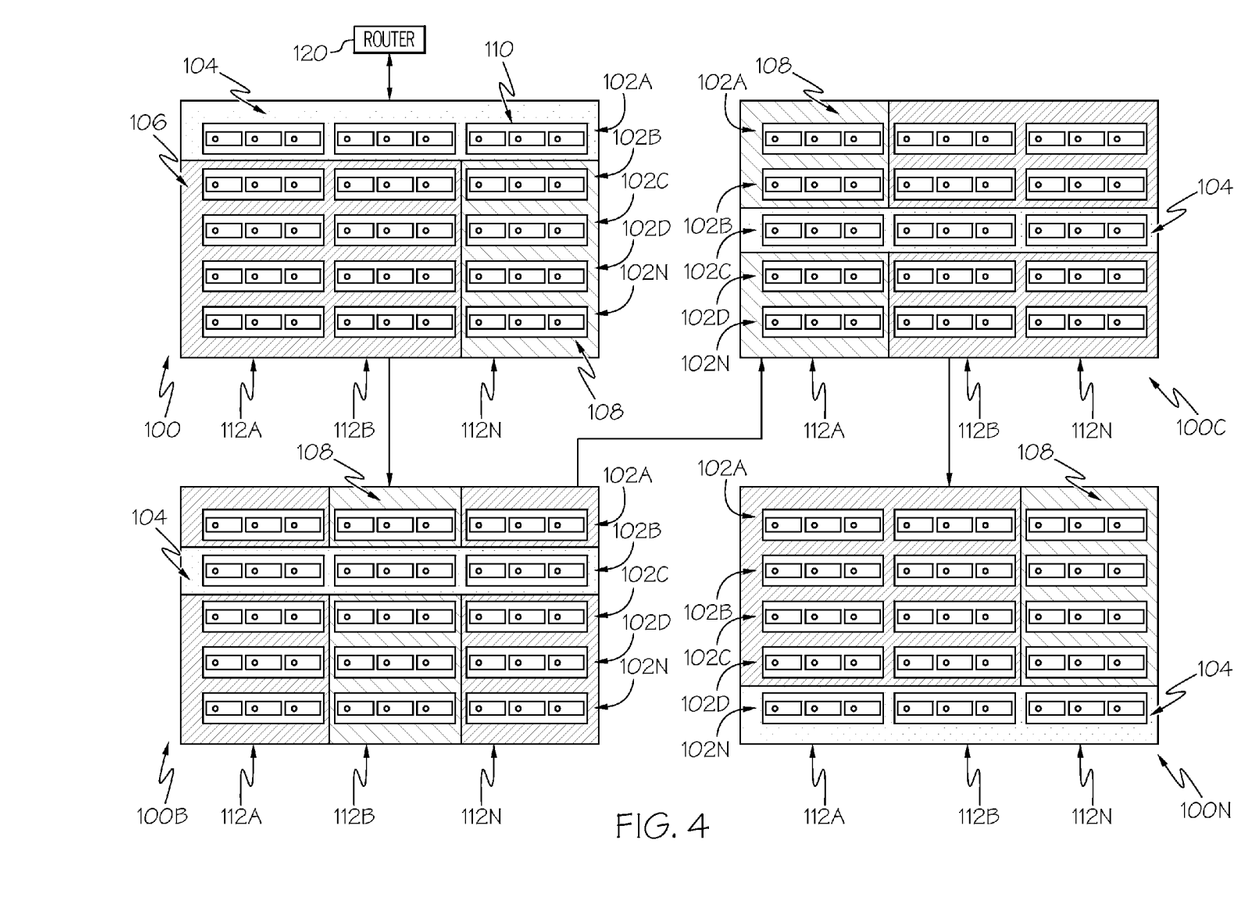
FIG. 4 depicts a system diagram according to an embodiment of the present invention.

Referring now to FIG. 4, a system diagram describing the functionality discussed herein according to an embodiment is shown. It is understood that the teachings recited herein may be practiced within any type of networked storage environment or virtualized/networked computing environment (e.g., a storage network of cloud computing environment 50). An illustrative plurality of memory devices 110 is shown in object storage cluster 100 of FIG. 4. Memory devices 110 may include, for example, any computer system/server 12 comprising HDDs, SSDs, tape, etc. In some embodiments, each memory device 110 may refer to a server/computer node.

Object storage typically describes a storage architecture that manages data as objects, as opposed, for example, to other storage architectures such as file systems that manage data as a file hierarchy or block storage systems that manage data as blocks within sectors and tracks. In object storage, each object typically includes data itself, a variable amount of metadata, and a globally unique identifier. The object storage architecture can be implemented at multiple levels, including, for example, the (object storage) device level, the system level, and the interface level.

In a redundant object storage, an object may be replicated (e.g., three times (3×)) and intelligently placed on a requisite number of distributed memory devices having unique storage location features (e.g., located on different racks, different systems, different drives). In a redundant object storage strategy, writing to the networked storage environment is configured or logically constrained to only return a success to a caller when a requisite plurality of memory devices have successfully written the object. If a set of memory devices are too few to diversely write in replication, then the object will not be written on that set of memory devices. Generally, instead a different set of memory devices will be used having the uniqueness to write the object in replication.

The inventors of the present invention have discovered several shortcomings of a networked storage environment that redundantly stores objects. For example, a distinct, separate storage space must be identified for each replicated object to be stored in the redundant networked storage environment, and then the copies stored therein. This creates a random set of storage locations dispersed throughout the networked storage environment. When storage locations are randomly located throughout the network, all memory devices in the network must remain powered on in order to ensure that at least one copy of any given object is available at any given time. Powering on all devices in the networked storage environment simultaneously can be an inefficient use of power.

The inventors have discovered that in a networked storage environment that redundantly stores objects for increased reliability, a set of objects can be redundantly stored across memory devices in one of several groups (e.g., pods) of memory devices. Furthermore, in order to maintain an available copy of an object, only one memory device from each group would need to be powered on at any given time. All other memory devices in the groups could be powered off or placed at a low power state in order to reduce power consumption. Additionally, in one or more groups, all memory devices could be powered on in order to provide a set of memory devices to which to write objects. The approaches described herein contain numerous advantages over present methods including, but not limited to, balancing object availability against power consumption while maintaining a set of redundantly stored objects for optimal reliability.

As shown in FIG. 4, memory devices in object storage cluster 100 are organized into pods. A pod can be thought of as a group of similarly configured or similarly functioning memory devices 110 that behave as a single replicated memory structure. In some embodiments, there may be the same number of memory devices 110 in each pod, for example based on a desired level of data replication (e.g., 3 memory devices associated with 3 data replicas, 5 memory devices associated with 5 data replicas, or the like). In some embodiments, pods may have a varied or differing number of memory devices 110 in each pod. In any case, this arrangement offers an improvement over typical replicated object storage, where object replicas are randomly written to any memory device in the object storage cluster where space can be found, thus necessitating that all memory devices remain powered on in order to ensure that an object replica is always available. By contrast, in the present invention, objects can be replicated and intelligently stored/written across a set of memory devices 110 in any one of pods 102A-N of object storage cluster 100. In embodiments of the invention, each pod can be organized in a manner that is designed to store any object as uniquely as possible. To this extent, memory devices 110 forming each pod may be selected such that they are from different physical locations within storage cluster devices and each have at least one unique failure domain storage location feature (e.g., different racks, different systems, different drives, different power sources, different cooling, etc.). Although FIG. 4 portrays object storage cluster 100 in a visual configuration that has the appearance of a physical storage rack, this configuration is provided for the sake of illustration only. Further, although the illustrated object storage cluster 100 includes three racks of five servers each (and therefore five pods or rows of three servers each), this figure is intended only to be illustrative and should not be construed as limiting.

Additionally, in redundant object storage, operations may be available to interact with stored objects, including write (PUT), read (GET), and DELETE. A PUT operation writes a new object to a memory device or creates an updated version of an existing object on a memory device, and in the latter instance, the previous version may or may not be removed from the memory device. Typically, however, when an updated version of an existing object is written to the memory device, the newer version is identified in metadata as an update (e.g., "version 2)", while older versions (e.g., "version 1") remain stored on the memory device. A DELETE operation is typically associated with writing a new version of an object to a memory device (e.g., via a PUT operation) and indicating a deletion of the old version. Where the old version of the object is physically removed from a memory device, the removal may be hard (e.g., the old version of the object is immediately rewritten as zero-byte version) or soft (e.g., the old version of the object is marked deleted in metadata and later rewritten). In one example of removal, the old version of the object may be cleaned up by an out-of-band process. A GET operation retrieves a representation of an object already stored on a memory device, for instance, in order to read the object.

In an embodiment of the present invention, object storage cluster 100 comprises one or more active pods of active memory devices 104 and one or more deactivated pods, where the deactivated pod has at least one designated memory device 108 and a set of deactivated memory devices 106. In some embodiments, each pod has the same, predetermined number of memory devices in it. Active memory devices 104 are powered on, and because several active memory devices 104 are grouped in a pod together, they have a level of uniqueness and the plurality of systems to read/retrieve a representation of an object already stored on disk (a GET operation), to write a new object to disk or update an existing object with a new version of the object (a PUT operation), and to, in response to a new version of an object being written, indicate deletion of an old version of that object (a DELETE operation). The old version of the object may be on the active memory devices 104, or a deactivated pod, discussed further below. Because of this versatility, an active pod may be characterized as being in a read-write configuration.

A set of deactivated memory devices 106 and one or more designated memory devices 108 are grouped together in one or more sets of deactivated pods. Deactivated memory devices 106 are powered off, offline, or in a low powered state (e.g., a suspended/sleep state), and no object can be written to them, retrieved, or removed while they are in this state. In some embodiments, deactivated memory devices 106 comprise powered off/offline/low powered state systems; in some other embodiments, deactivated memory devices 106 comprise powered-on systems having individual components (e.g., drives, peripheral cards) that are powered off, offline, or in a low powered state. Designated memory devices 108 are so named in this application because each designated memory device 108 is designated as being accessible in a deactivated pod otherwise having one or more deactivated memory devices 106. Because each designated memory device 108 is grouped in a pod with the remainder one or more memory devices in the pod being deactivated memory devices 106, designated memory devices 108 lack a level of uniqueness and the plurality of systems to write a new object to disk or replace an existing object with a new version of the object (a PUT operation). However, designated memory devices 108 can retrieve a representation of an object already stored on disk (a GET operation), and receive an indication that an object stored on set of deactivated memory devices 106/designated memory devices 108 is an old version that has been replaced with a new version on active memory devices 104 (a DELETE operation). Because of this, a deactivated pod may be characterized as being in a read-only configuration.

In an embodiment of the present invention, one or more pods 102A-N of object storage cluster 100 are active pods and have all active memory devices 104. For example, in object storage cluster 100 of illustrative FIG. 4, pod 102A has been designated as an active pod of active memory devices 104. In some embodiments, each of the remainder of pods 102B-N may comprise deactivated pods, having deactivated memory devices 106 and designated memory devices 108. In object storage cluster 100 of illustrative FIG. 4, each of pods 102B-N is a deactivated pod which comprises a set of deactivated memory devices 106 and a designated memory device 108. Although in some embodiments a memory device's power state is designated based on its pod location or rack, these are intended only as illustrative embodiments and should not be construed as limiting.

In illustrative object storage cluster 100, a PUT operation to write a new object or write an updated version of a pre-existing object, may be executed across a set of active memory devices 104, here in pod 102A. Because object stores are configured or logically constrained to only return a success to a caller when a number of systems have successfully put the object to disk, a PUT operation may not be executed upon a pod of servers/machines other than an active pod of active memory devices 104. Therefore, no object may be written to any memory device of a deactivated pod by a PUT operation. Rather, all PUT operations are performed on the active pod. In some instances, an updated version of an existing object will be written to the memory devices of the active pod and designated as a newer version (e.g., "version 2"), wherein the pre-existing object is stored on a deactivated pod with an older version designation (e.g., "version 1") and may remain thereon stored. In some embodiments, intelligent router 120 may be configured to direct requests to write a new object or to write an updated version of an existing object to an active pod of active memory devices 104.

Furthermore, in illustrative object storage cluster 100, a GET operation to read/retrieve a representation of a stored object may be executed on any powered-on machine that contains the object, including any active memory device 104 and designated memory devices 108 on which the object is stored. In some embodiments, intelligent router 120 may be configured to find/determine a most recent version of an object from among active memory devices 104 and designated memory devices 108 and retrieve a representation of that stored object. As discussed above, objects may be replicated and placed intelligently across a set of servers in pods 102A-N. Therefore, as long as one server/machine in each pod is powered on, every object will have at least one readable/retrievable copy available online.

Furthermore, in some embodiments, a DELETE operation may be associated with writing a new version of an object to a memory device where the DELETE operation indicates a deletion of the old version. In some embodiments, a DELETE operation may tag a directory of objects and designate them as deleted or perform a physical removal of the objects (e.g., immediately rewritten, or later cleaned up by an out-of-band process). For example, in illustrative object storage cluster 100, a DELETE operation to delete a set of replicas of an old version of an object may be executed across all active memory devices 104 storing the object. Alternatively, a DELETE operation to delete a set of replicas of an old version of an object stored in a deactivated pod comprising designated and deactivated memory devices (e.g., pods 102B-N) may cause the old version of the object stored therein to be indicated as deleted, and subsequently removed from the pod (e.g., when the pod becomes an active pod).

In an embodiment of the present invention, one or more pods in succession may be reclassified as active pods having active memory devices 104. In some embodiments, classification as an active pod may be rotated through (e.g., pod by pod) object storage cluster 100. In some embodiments, rotation of active pods is based on a capacity threshold, a threshold incremental capacity increase, a time basis, or a memory device failure or error. An example of a capacity threshold may include a set amount of storage space available on a server machine. An example of a threshold incremental capacity increase may include a pre-set amount of space which may be written to in a given period. An example of a time basis may include a set time period between rotations. An example of a device failure or error may include a drive failure. These rotations may be performed, for instance, by an automated computer system (e.g., computer system 12) responsive to events such as the capacity threshold, the threshold incremental capacity increase, or the time basis discussed above.

By way of illustrative example, a pod of active, powered on memory devices 104 in object storage cluster 100 may be configured as shown in object storage cluster 100B, or in object storage cluster 100C, or so forth such as in object storage cluster 100N. For example, the reconfiguration shown in object storage cluster 100B is such that pod 102B is the active pod and contains all active memory devices 104. Likewise, in the reconfigurations shown in object storage cluster 100B and 100N, pods 102C and 102N, respectively, have each been reclassified as active pods. In each of these embodiments, the other pods have each been reclassified as deactivated pods and contain a set of deactivated memory devices 106 and a designated memory device 108. Furthermore, as some pods are rotated from an activated state to a deactivated state, others will be rotated from a deactivated state to an activated state, and vice versa, such that there is always at least one active pod, with the remainder of the pods being deactivated pods. This deactivation of certain pods allows object storage cluster 100 to save energy that would otherwise be consumed by storage devices that are not being fully utilized while maintaining full object storage functionality (e.g., GET, PUT, DELETE) in an optimal networked storage environment.

In another embodiment of the present invention, one or more memory devices within a deactivated pod may be reclassified, sometimes in succession, as designated memory device 108 within object storage cluster 100. In some embodiments, rotation of designated memory devices 108 is based on a time basis, byte read basis, or a promotion cycle. A time basis may include a set time period between rotations. A byte read basis may include a data read time. This reclassification can allow more than one memory device in a deactivated pod to be utilized as the designated memory device 108 over time, potentially reducing the wear on a single memory device and/or equalizing wear over the memory devices in a deactivated pod. These rotations may be performed, for instance, by an automated computer system (e.g., computer system 12) responsive to events such as the time basis, the byte read basis, or the promotion cycle discussed above.

As way of illustrative example, a deactivated pod (comprising designated memory devices 108 and deactivated memory devices 106) in object storage cluster 100 may be reconfigured as shown in object storage clusters 100B, 100C, and 100N. Designated memory devices 108 may be, for example, rotated across racks 112A-N of object storage cluster 100. In the example of FIG. 4, racks 112A, 112B, and so forth, to 112N may be reclassified as designated memory devices 108. Although shown here across entire illustrated racks, an entire rack need not be designated at the same time. However, in some embodiments, the same rack may always comprise designated memory devices 108 in order to localize power cycle events. The designated memory devices 108 may also be spread across different racks and/or there may be more than one designated memory device 108 in the same deactivated pod.

In yet another embodiment, in the event of a drive failure in one of designated memory devices 108, a deactivated memory device 106 from the same pod and therefore containing replicas of objects stored in the failed designated memory device 108 may be powered on and reclassified as a designated memory device 108. In turn, the failed designated memory device 108 may be reclassified as a deactivated memory device 106 and powered off. Generally, a failed designated memory device 108 will not be powered off until the failed drives are replaced and a replica rebuilt on the replacement deactivated memory device 106, which has been powered on. In some embodiments, in the event of a failure, after a formerly deactivated memory device 106 is powered on, any drives not needed to rebuild the replica may be powered off in the failed machine.

In still other embodiments, power may be conserved by a partial or complete powering down of active memory devices 104 or designated memory devices 108. For example, designated memory devices 108 may be placed in a low power (e.g., sleeping or suspended) or off state until a request to retrieve an object (i.e., GET operation) is received, and then a single device powered on to perform the operation; in some embodiments, the device may return to sleep after performing the operation. In some embodiments, a designated memory device 108 in a low power or off state may power on in response to receiving a threshold number of requests to retrieve an object or in response to receiving a threshold number of requests within a threshold time period. In another example, only a sub-set of active memory devices 104 may be fully powered; when an operation is received to place a new object to disk or update an existing object with a new version (i.e., PUT operation), active memory devices 104 may be briefly powered to replicate and store the object before returning to a low power (e.g., suspended or sleeping) or off state. In yet another example, individual drives and other components (e.g., add-on cards) within a server/system chassis may be powered off in lieu of powering off entire servers/systems.

It is understood that all scaling of machines and object replicas described herein and shown in the figures are merely illustrative embodiments of the present invention, and are not intended to be limiting. For example, the number of object replicas may be varied based on, inter alia, desired durability or reliability. Moreover, the number of machines classified as designated memory devices 108 may be scaled based on, inter alia, a requested read capacity. And the number of pods classified as active memory devices 104 may be scaled based on, inter alia, a specified write capacity.

Figure 5:
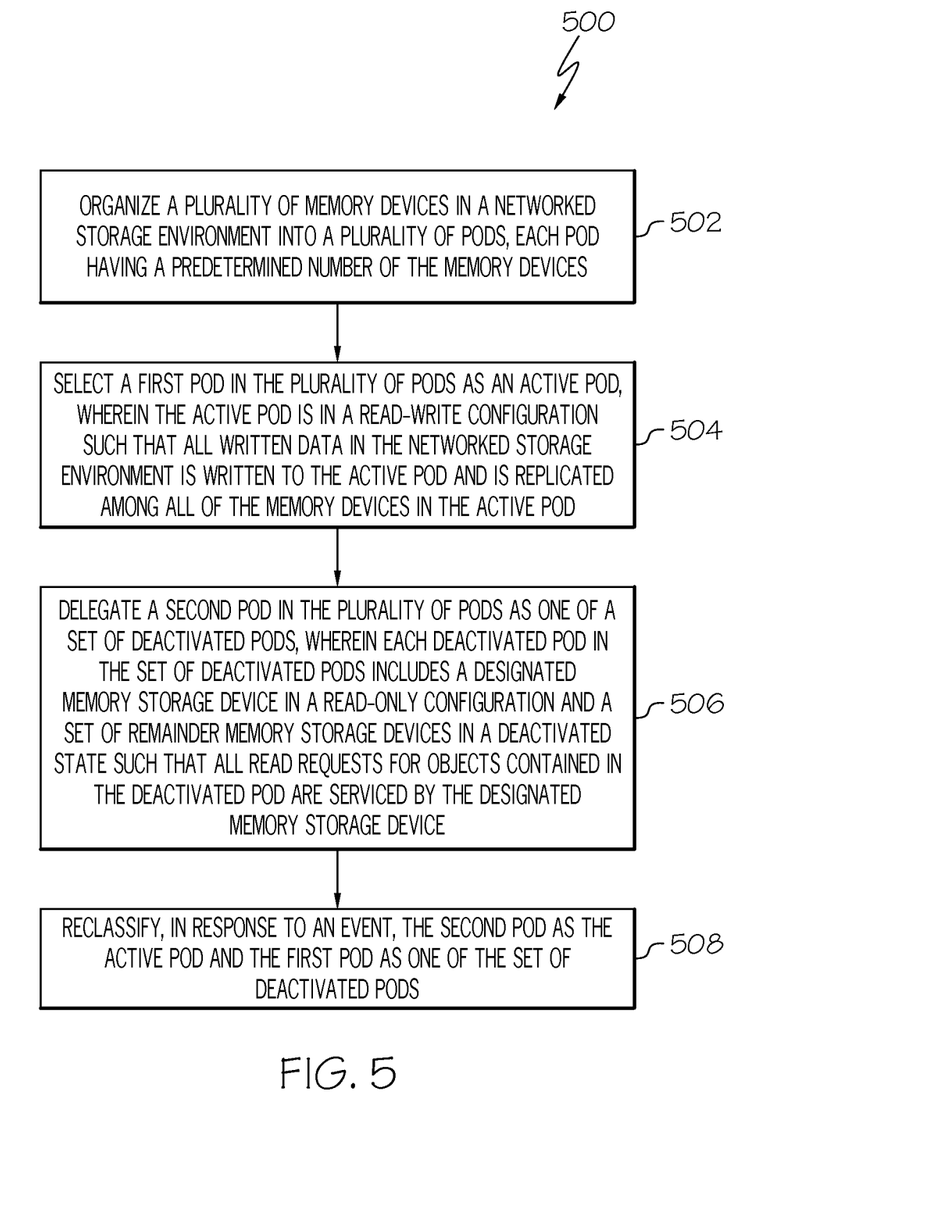
FIG. 5 depicts a process flowchart according to an embodiment of the present invention.

Referring now to FIG. 5, a process flowchart 500 for object storage in a networked storage environment according to embodiments is shown. At step 502, a plurality of memory devices in a networked storage environment is organized into a plurality of pods, each pod having a predetermined number of the memory devices. At step 504, a first pod in the plurality of pods is selected as an active pod, wherein the active pod is in a read-write configuration such that all written data in the networked storage environment is written to the active pod and is replicated among all of the memory devices in the active pod. At step 506, a second pod in the plurality of pods is delegated (e.g., selected, chosen, identified) as one of a set of deactivated pods, wherein each deactivated pod in the set of deactivated pods includes a designated memory storage device in a read-only configuration and a set of remainder memory storage devices in a deactivated state such that all read requests for objects contained in the deactivated pod are serviced by the designated memory storage device. At step 508, in response to an event, the second pod is reclassified as the active pod and the first pod as one of the set of deactivated pods.

Process flowchart 500 of FIG. 5 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Embodiments of the present invention offer several advantages in the network and cloud computing environments. Specifically, embodiments balance offering availability of objects with consumption of power, while maintaining a set of multi-replicated objects for optimal durability. This permits frequent retrieval of stored data, which may be stored for both extended and short periods of time.

For example, in the embodiment shown in FIG. 4, only seven of the fifteen servers/systems/machines/devices are powered on at any given time, a greater than 50% reduction in power consumption; yet a fully functioning cluster is maintained. As can be seen, in redundant object storage where objects are replicated three times and intelligently placed, up to two-thirds of all systems could be powered off at any given time without impacting availability of any object. In general, to maintain availability and write-ability of objects, the number of servers or machines in a server cluster to power on is represented by the equation:

$$Min=(S/R)+(R-1)$$

where:
- S is the number of machines or servers in the cluster;
- R is the number of replicas per object; and
- Min is the minimal number of machines powered on.

While shown and described herein as an object storage solution, it is understood that the invention further provides various alternative embodiments. For example, in one embodiment, the invention provides a computer-readable/useable medium that includes computer program code to enable a computer infrastructure to provide object storage functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide object storage power consumption optimization functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for object storage power consumption optimization management. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for object storage in a networked storage environment, the method comprising the processes of:
    organizing a plurality of memory devices in a networked storage environment into a plurality of pods, each pod having a predetermined number of the memory devices;
    selecting a first pod in the plurality of pods as an active pod, wherein the active pod is in a read-write configuration such that all written data in the networked storage environment is written to the active pod and is replicated among all of the memory devices in the active pod;
    delegating a second pod in the plurality of pods as one of a set of deactivated pods, wherein each deactivated pod in the set of deactivated pods includes a designated memory storage device in a read-only configuration and a set of remainder memory storage devices in a deactivated state such that all read requests for objects contained in the deactivated pod are serviced by the designated memory storage device; and
    reclassifying, in response to an event, the second pod as the active pod and the first pod as one of the set of deactivated pods,
    wherein the number of remainder memory storage devices in a deactivated state is at least one and at most represented by the formula:

$$S-(S/R)-(R-1),$$

where S is the number of the memory devices in the plurality of memory devices and R is a number of data replicas among all memory devices in a pod of the plurality of pods, and where S is greater than R.

2. The method of claim 1, wherein the event comprises at least one of: a capacity threshold, a threshold incremental capacity increase, a time interval, or a device failure.

3. The method of claim 1, further comprising the step of:
redesignating the designated memory storage device as one of the set of remainder memory storage devices and also redesignating one of the remainder memory storage devices as the designated memory storage device in response to at least one of: a time interval, a byte read basis, a promotion cycle, and a device failure of the designated memory storage device.

4. The method of claim 1, further comprising the steps of:
storing, in response to a command to change an object in the networked storage environment that is currently being stored on a deactivated pod of the set of deactivated pods, a changed object on the active pod;
storing a change indicator for the object; and
removing, in response to the deactivated pod being reclassified as the active pod, the object from the reclassified pod.

5. The method of claim 1, wherein the networked storage environment is a cloud computing environment.

6. The method of claim 1, wherein each memory device of a pod comprises at least one unique failure domain storage location feature from each other memory device of the pod.

7. A memory storage system for storing objects in a networked storage environment, comprising:
a plurality of memory storage devices in a networked storage environment;
a set of pods into which the plurality of memory storage devices are organized, the set of pods including an active pod and a set of deactivated pods, each pod of the set of pods having a plurality of the memory storage devices of a predetermined number; and
at least one computer device that executes a set of instructions that causes the system to:
write, in response to a request to write an object, the object on all of the memory storage devices in the active pod, wherein all writes performed in the networked storage environment are performed on the active pod;
retrieve, in response to a read request for an object stored on a deactivated pod of the set of deactivated pods, the object from a designated memory storage device in the deactivated pod, all remainder memory storage devices in the deactivated pod being deactivated; and
reclassify, in response to an event, the active pod as one of the deactivated pods and one of the deactivated pods as the active pod,
wherein the number of remainder memory storage devices in a deactivated state is at least one and at most represented by the formula:

$$S-(S/R)-(R-1),$$

where S is the number of the memory devices in the plurality of memory devices and R is a number of data replicas among all memory devices in a pod of the plurality of pods, and where S is greater than R.

8. The memory storage system of claim 7, wherein the event comprises at least one of: a capacity threshold, a threshold incremental capacity increase, a time interval, or a device failure.

9. The memory storage system of claim 7, the computer device further comprising instructions for causing the system to:
redesignate the designated memory storage device as one of the set of remainder memory storage devices and also redesignate one of the remainder memory storage devices as the designated memory storage device in response to at least one of: a time interval, a byte read basis, a promotion cycle, and a device failure of the designated memory storage device.

10. The memory storage system of claim 7, the computer device further comprising instructions for causing the system to:
store, in response to a command to change an object in the networked storage environment that is currently being stored on a deactivated pod of the set of deactivated pods, a changed object on the active pod;
store a change indicator for the object; and
remove, in response to the deactivated pod being reclassified as the active pod, the object from the reclassified pod.

11. The memory storage system of claim 7, wherein the networked storage environment is a cloud computing environment.

12. The memory storage system of claim 7, wherein each memory device of a pod comprises at least one unique failure domain storage location feature from each other memory device of the pod.

13. A computer program product for object storage in a networked storage environment, the computer program product comprising a computer readable storage device, and program instructions stored on the computer readable storage device, to:
organize a plurality of memory devices in a networked storage environment into a plurality of pods, each pod having a predetermined number of the memory devices;
select a first pod in the plurality of pods as an active pod, wherein the active pod is in a read-write configuration such that all written data in the networked storage environment is written to the active pod and is replicated among all of the memory devices in the active pod;
delegate a second pod in the plurality of pods as one of a set of deactivated pods, wherein each deactivated pod in the set of deactivated pods includes a designated memory storage device in a read-only configuration and a set of remainder memory storage devices in a deactivated state such that all read requests for objects contained in the deactivated pod are serviced by the designated memory storage device; and
reclassify, in response to an event, the second pod as the active pod and the first pod as one of the set of deactivated pods,
wherein the number of remainder memory storage devices in a deactivated state is at least one and at most represented by the formula:

$$S-(S/R)-(R-1),$$

where S is the number of the memory devices in the plurality of memory devices and R is a number of data replicas among all memory devices in a pod of the plurality of pods, and where S is greater than R.

14. The computer program product of claim 13, wherein the event comprises at least one of: a capacity threshold, a threshold incremental capacity increase, a time interval, or a device failure.

15. The computer program product of claim 13, the computer readable storage device further comprising instructions to:
   redesignate the designated memory storage device as one of the set of remainder memory storage devices and also redesignate one of the remainder memory storage devices as the designated memory storage device in response to at least one of: a time interval, a byte read basis, a promotion cycle, and a device failure of the designated memory storage device.

16. The computer program product of claim 13, the computer readable storage device further comprising instructions to:
   store, in response to a command to change an object in the networked storage environment that is currently being stored on a deactivated pod of the set of deactivated pods, a changed object on the active pod;
   store a change indicator for the object; and
   remove, in response to the deactivated pod being reclassified as the active pod, the object from the reclassified pod.

17. The computer program product of claim 13, wherein the networked storage environment is a cloud computing environment.

18. The computer program product of claim 13, wherein each memory device of a pod comprises at least one unique failure domain storage location feature from each other memory device of the pod.

* * * * *